Jan. 12, 1971  JIRO SEKINE  3,554,633

SWITCH CIRCUIT FOR MOTION PICTURE CAMERA

Filed March 22, 1968

INVENTOR.
JIRO SEKINE
BY Sughrue, Rothwell, Mion,
Zinn & Macpeak
ATTORNEYS

United States Patent Office

3,554,633
Patented Jan. 12, 1971

3,554,633
SWITCH CIRCUIT FOR MOTION PICTURE CAMERA
Jiro Sekine, Tokyo, Japan, assignor to Fuji Shashin Film Kabushiki Kaisha, Kanagawa, Japan
Filed Mar. 22, 1968, Ser. No. 715,351
Claims priority, application Japan, Mar. 22, 1967, 42/23,709
Int. Cl. G03b 19/18, 9/06
U.S. Cl. 352—141                  4 Claims

ABSTRACT OF THE DISCLOSURE

A switch circuit for use in a motion picture camera having a servomotor controlled iris. The servomotor operates only after the picture taking switch has been operated. The switch circuit prevents operation of the film-driving motor until the servomotor driving the iris is still or nearly still.

BACKGROUND OF THE INVENTION

Field of the invention

The present invention relates to a switch circuit for a film driving motor in a motion picture camera having a servomotor controlled automatic exposure.

Description of the prior art

Most of the recent motion picture cameras for amateur use have an automatic exposure controlling device, hereinafter called an EC-mechanism. The meter type EC-mechanism has been replaced with a servomotor type EC-mechanism which uses a servomotor to control an iris diaphragm to maintain the light value through the iris equal to the light value needed for correct exposure of the film. But for the servomotor type EC-mechanism, a large amount of electric current is required. In the meter type EC-mechanism, consumption of current is required. In the meter type EC-mechanism, consumption of current from the driving battery negligibly small even if the circuit is closed. In the servomotor type EC-mechanism, electric current flows even when the servomotor is not used and light is not shining on the light receptor. Thus the battery is rapidly worn out in keeping the diaphragm set in a predetermined size. In order to prevent this consumption in the cell, the circuit of the servomotor should only be closed shortly before starting the filming. But unless there is some minimal delay after the switch activating the servomotor circuit is closed before the film driving motor is started, the film is driven before correct exposure is provided on the film and the beginning part of the film is not correctly exposed.

SUMMARY OF THE INVENTION

To eliminate this disadvantage, the switch is closed in two steps. An interval of time is provided after setting the irris diaphragm in the first step before starting the film driving motor in the second step. This time interval complicates the shutter release operation.

The first object of the present invention is to provide a film driving motor switch circuit, wherein one shutter releasing action closes the servomotor circuit immediately before shutter release and then the shutter is released for driving the film when the correct exposure is gained by controlling the diaphragm.

This and other objects of the present invention will be understood from the following description and appended claims taken in conjunction with the accompanying drawing in which:

DESCRIPTION OF THE PREFERRED EMBODIMENTS

Figure 1:
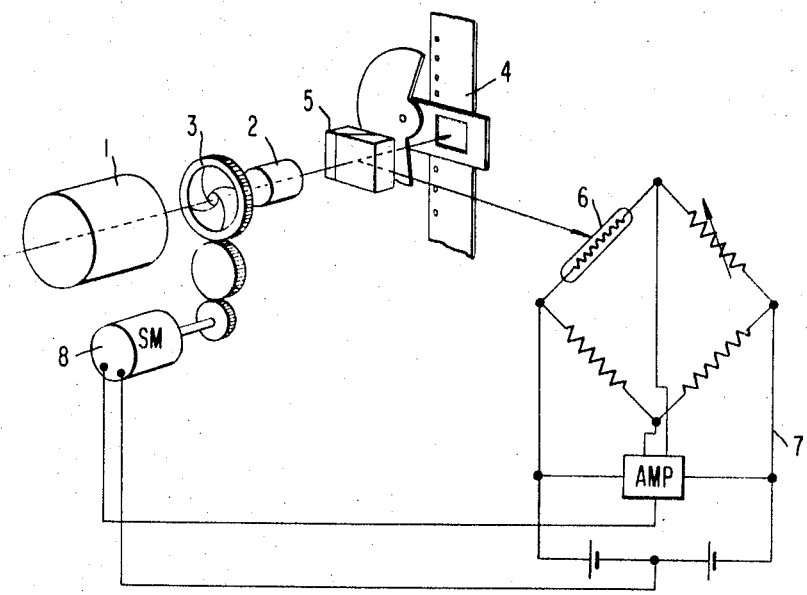
FIG. 1 is a schematic view of the servomotor type EC-mechanism as used in a conventional motion picture. camera.

Referring now to FIG. 1, there is shown a schematic view of the conventional servomotor type EC-mechanism, wherein the reference numerals 1, 2 denote the optical system, 3 an iris diaphragm, 4 a motion picture film, and 5 an optical element having a half-silvered mirror. The light reflected by the half-silvered mirror of the optical element 5 is received by a CdS light receptor 6. A controlling circuit 7 drives a servomotor 8 thereby controlling the iris diaphragm 3 to keep the light value on the light receptor 6 constant, whereby the correct exposure is made on the film 4. The mechanism for driving the motion picture film 4 is separated from and independent of the servomotor circuit.

Figure 2:
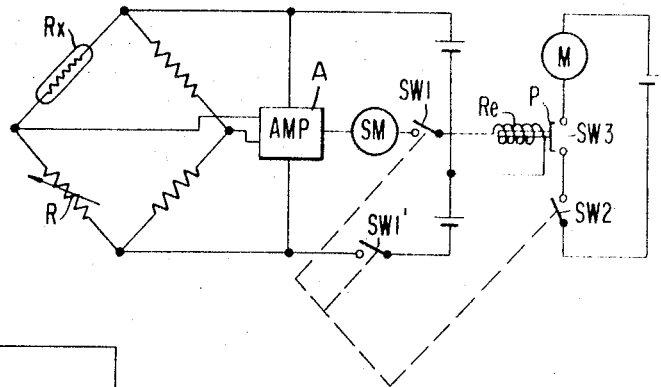
FIG. 2 is a diagram of the switch circuit in accordance with the present invention.

The switch circuit of the present invention is a switch circuit for a servomotor type EC-mechanism, which circuit is closed after the servomotor 8 has finished changing the iris diaphragm 3 of the motion picture camera. FIG. 2 shows the switch circuit in accordance with the present invention. The film driving motor circuit is connected to a control circuit as shown in FIG. 1. The reference character $R_x$ denotes a photoelectric element having an electric resistance varying in response to the light value shining thereon. R is a variable resistance for adjustment according to the film sensitivity or the taking speed of the motion picture. M is a film driving motor. $SW_1$, $SW_1'$ and $SW_2$ are switches for closing the circuit in response to the movement of the shutter release button (not shown), and R$e$ is a spring biased relay for opening the moveable shunt piece P which is biased for closing the switch $SW_3$ of the film driving motor circuit. The reference character A denotes an amplifier circuit, and SM denotes a servomotor for controlling the size of the iris diaphragm 3 in the picture taking optical system 1 and 2.

On pushing down the shutter release button of the motion picture projector having a film driving motor circuit such as described above, the switches $SW_1$, $SW_1'$ and $SW_2$ are closed. The light passes through the picture taking optical system 1 and 2 and the diaphragm 3 shines on the photoelectric element $R_x$ through the half-silvered mirror in the optical element 5 having been reduced in its light value by a definite proportion. Therefore, the value of the variable resistance R with respect to the resistance of the photoelectric element $R_x$ will unbalance the bridge, when the light value provided on the film 4 is not proper, and the unbalanced bridge error signal is amplified by the amplifier circuit A, and used to drive the servomotor SM for controlling the diaphragm 3. At this moment the relay R$e$ moves the moveable shunt piece P to open the switch $SW_3$. Because electric current flows through the relay R$e$ until the iris diaphragm 3 is correctly controlled, the film driving motor M is not rotated and the film 4 is not driven until the iris diaphragm 3 is controlled to a proper size. When the servomotor is finished changing the diaphragm 3 to giving the correct exposure, the bridge circuit is balanced and no current flows thorugh the servomotor SF. Thus, the relay R$e$ releases the moveable shunt piece P which closes the switch $SW_3$. Then the film driving motor M rotates to drive the film 4 to take the motion picture.

As described above, because the film is not driven until the correct exposure is provided on the film 4, the exposure on the film 4 is always correct. Moreover, as the EC-mechanism is not required to be operated long before actually taking pictures, the electric source circuit can be opened until the shutter release button is pushed down and therefore the consumption in the battery is extremely small. In case the light value is too large or too small film driving can be prevented. By selecting the strength of the spring for biasing the moveable shunt piece P towards closing the switch $SW_3$ of the film driving motor circuit, the servomotor can be set such that a small variation of the incident light intensity will not cause the film driving motor to stop the motion picture.

Figure 3:
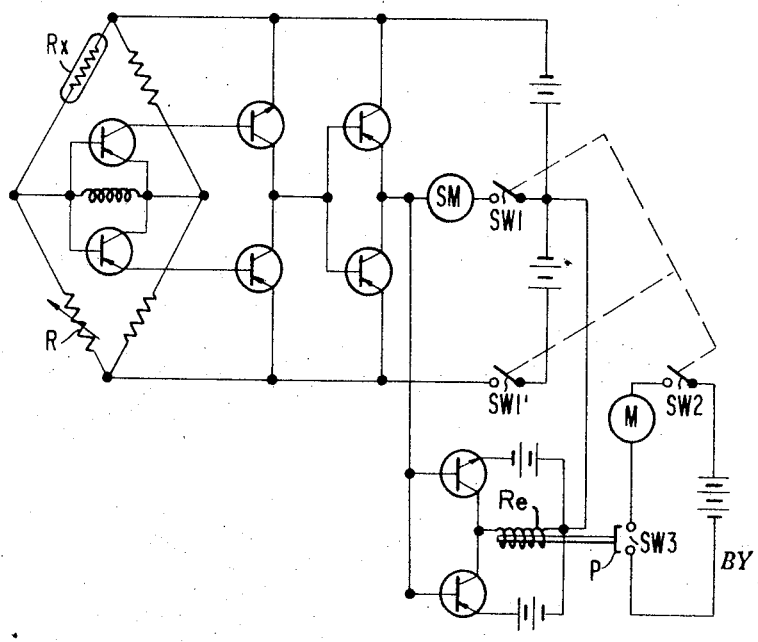
FIG. 3 is a diagram of another embodiment of the switch circuit in accordance with the present invention.

In the above description based on FIG. 2, an embodiment in which the servomotor SM and the relay $Re$ are connected in series is described. FIG. 3 shows the circuit of amplifier A and further shows that an amplifier circuit may be used in conjunction with the relay $Re$ to improve the operation of switch $SW_3$.

The invention has been described in detail with particular reference to an embodiment thereof, but it will be understood that a skilled artisan may effect variations and modifications within the spirit and scope of the invention as described hereinabove and as defined in the claim language. The limitations of the specification are not intended to limit the invention, which can only be defined in terms of what is claimed.

I claim:
1. In a motion picture camera having a film driving motor circuit, a variable iris means for controlling the amount of light allowed to reach the film, light measuring means for generating an electrical signal indicative of the amount of light reaching the film, and servomotor means responsive to said electrical signal for varying said iris means, the improvement comprising:
   (a) switch means responsive to said signal for opening said film driving motor circuit while said servomotor operates, said switch means being biased to close said film driving motor circuit when said servomotor is not operating.

2. A system according to claim 1 wherein said switch means comprises:
   (a) a mechanically biased shunt piece biased to close said film driving motor circuit in the absence of said signal, and
   (b) a relay means responsive to said signal for moving said shunt piece in opposition to said mechanical bias to open said film driving motor circuit.

3. A system according to claim 2 wherein said light measuring means for generating an electrical signal indicative of the amount of light reaching the film comprises:
   (a) a bridge circuit having a photosensitive resistor for receiving light passed through said variable iris means and having a variable resistor for setting according to a parameter indicating the amount of light needed by the film under the conditions of operation and,
   (b) means for obtaining said signal from said bridge circuit, said signal being an error signal indicating the difference between the amount of light allowed to reach the film and said amount of light needed.

4. A system according to claim 2 wherein said servomotor is in series with the coil of said relay means such that, when said servomotor is operating, said relay operates to open said film driving motor circuit.

References Cited
UNITED STATES PATENTS

| | | | |
|---|---|---|---|
| 3,122,978 | 3/1964 | Blieske | 95—10(C) |
| 3,197,783 | 7/1965 | Ann et al. | 352—141X |
| 3,426,662 | 2/1969 | Sevin | 95—10(C) |
| 3,430,053 | 2/1969 | Westhaver | 95—10(C)X |
| 3,452,656 | 7/1969 | Ruhle et al. | 95—10(C) |

JOHN M. HORAN, Primary Examiner

J. F. PETERS, Jr., Assistant Examiner

U.S. Cl. X.R.
95—64; 352—176